United States Patent
Chien et al.

(10) Patent No.: US 10,855,108 B2
(45) Date of Patent: Dec. 1, 2020

(54) WIRELESS DEVICE

(71) Applicant: TDK TAIWAN CORP., Taoyuan (TW)

(72) Inventors: Feng-Lung Chien, Taoyuan (TW);
Mao-Chun Chen, Taoyuan (TW);
Hsiang-Hui Hsu, Taoyuan (TW);
Kuo-Jui Lee, Taoyuan (TW);
Chien-Hung Lin, Taoyuan (TW)

(73) Assignee: TDK Taiwan Corp., Taoyuan (TW)

( * ) Notice: Subject to any disclaimer, the term of this patent is extended or adjusted under 35 U.S.C. 154(b) by 85 days.

(21) Appl. No.: 16/198,032

(22) Filed: Nov. 21, 2018

(65) Prior Publication Data

US 2019/0156997 A1    May 23, 2019

Related U.S. Application Data

(60) Provisional application No. 62/589,305, filed on Nov. 21, 2017, provisional application No. 62/595,820, filed on Dec. 7, 2017.

(30) Foreign Application Priority Data

Nov. 8, 2018  (CN) .................... 2018 2 1838005 U

(51) Int. Cl.
| | |
|---|---|
| *H02J 50/00* | (2016.01) |
| *H01F 38/14* | (2006.01) |
| *H02J 7/02* | (2016.01) |
| *H02J 50/10* | (2016.01) |
| *H04B 5/00* | (2006.01) |
| *H01F 27/29* | (2006.01) |
| *H01F 27/28* | (2006.01) |
| *H01F 27/30* | (2006.01) |

(52) U.S. Cl.
CPC .......... *H02J 50/00* (2016.02); *H01F 27/2804* (2013.01); *H01F 27/2823* (2013.01); *H01F 27/29* (2013.01); *H01F 27/306* (2013.01); *H01F 38/14* (2013.01); *H02J 7/025* (2013.01); *H02J 50/10* (2016.02); *H04B 5/0037* (2013.01)

(58) Field of Classification Search
CPC .... H01F 38/14; H01F 27/2804; H01F 27/006; H01F 27/2823; H01F 27/29; H02J 50/10; H02J 50/12; H02J 50/70; H02J 7/025
See application file for complete search history.

(56) References Cited

U.S. PATENT DOCUMENTS

2017/0228721 A1*  8/2017  Lee .................... H04B 5/0081

* cited by examiner

*Primary Examiner* — Carlos Amaya
(74) *Attorney, Agent, or Firm* — Muncy, Geissler, Olds & Lowe, P.C.

(57) ABSTRACT

A wireless device is provided and includes a coil assembly. The coil assembly includes a first coil, a second coil, a first contact, a second contact, and a third contact. The second coil is configured to be connected to the first coil in series. The first contact is configured to be connected to a first end of the first coil. The second contact is configured to be connected between the first coil and the second coil. The third contact is configured to be connected to a second end of the second coil. The first contact, the first coil and the second contact form a first circuit loop, and the first contact, the first coil, the second coil and the third contact form a second circuit loop.

12 Claims, 20 Drawing Sheets

WIRELESS DEVICE

CROSS REFERENCE TO RELATED APPLICATIONS

This application claims the benefit of U.S. Provisional Application No. 62/589,305, filed on Nov. 21, 2017, U.S. Provisional Application No. 62/595,820, filed on Dec. 7, 2017, and China Patent Application No. 201821838005.1, filed on Nov. 8, 2018, the entirety of which are incorporated by reference herein.

BACKGROUND OF THE DISCLOSURE

Field of the Disclosure

The present disclosure relates to a wireless device, and more particularly to a wireless device that has wires on at least two layers.

Description of the Related Art

As technology has progressed, many kinds of electronic devices such as tablet computers and smartphones have begun to include the functionality of wireless charging. A user can place the electronic device on a wireless charging transmitting terminal, so that the wireless charging receiving terminal in the electronic device can generate current to charge the battery by electromagnetic induction or electromagnetic resonance. Due to the convenience of wireless charging, electronic devices equipped with wireless charging modules have gradually become popular.

In general, the wireless charging device includes a magnetic conductive plate to support a coil. When the coil is provided with electricity to operate in a wireless charging mode or a wireless communication mode, the magnetic conductive plate can concentrate the magnetic lines of force emitted from the coil for better performance. However, the existing way of winding the coil does not meet the various requirements for wireless devices, such as better charging performance, better communication performance, and less thickness.

Therefore, how to design a wireless device capable of fulfilling the user's various needs is a topic nowadays that needs to be discussed and solved.

BRIEF SUMMARY OF THE DISCLOSURE

Accordingly, one objective of the present disclosure is to provide a wireless device to solve the above problems.

According to some embodiments of the disclosure, a wireless device is provided and includes a coil assembly. The coil assembly includes a first coil, a second coil, a first contact, a second contact, and a third contact. The second coil is configured to be connected to the first coil in series. The first contact is configured to be connected to a first end of the first coil. The second contact is configured to be connected between the first coil and the second coil. The third contact is configured to be connected to a second end of the second coil. The first contact, the first coil and the second contact form a first circuit loop, and the first contact, the first coil, the second coil and the third contact form a second circuit loop.

According to some embodiments, the first circuit loop operates in a near field communication band, and the second circuit loop operates as a transmitting terminal or a receiving terminal in electrical power transmission.

According to some embodiments, the second coil surrounds a portion of the first coil.

According to some embodiments, the first coil includes a first metal wire and a second metal wire respectively disposed on a second plane and a first plane, the second coil includes a third metal wire, and the third metal wire is disposed on the first plane and surrounds the second metal wire.

According to some embodiments of the disclosure, a wireless device is provided and includes a first coil, and the first coil includes a first metal wire and a second metal wire. The first metal wire is disposed in a first plane and has a first spiral structure. The second metal wire is disposed on a second plane and has a second spiral structure. The second metal wire is electrically connected to the first metal wire. The first metal wire and the second metal wire are continuously extended.

According to some embodiments, the wireless device further includes a connecting member disposed on a third plane, and the connecting member is electrically connected to a first end of the first coil.

According to some embodiments, the third plane is located between the first plane and the second plane.

According to some embodiments, the first metal wire is connected to the second metal wire in parallel.

According to some embodiments, the wireless device further includes a plurality of metal connectors disposed around the connecting member for electrically connecting the first and second metal wires.

According to some embodiments, the wireless device further includes a first separating portion and a second separating portion. The first separating portion is disposed between two adjacent turns of the first metal wire. The second separating portion is disposed between two adjacent turns of the second metal wire. The first metal wire has a first inclined section, the second metal wire has a second inclined section, the first separating portion is electrically connected to the second metal wire by a conductive assembly and the second inclined section, and the second separating portion is electrically connected to the first metal wire by another conductive assembly and the first inclined section.

According to some embodiments, the wireless device further includes a plurality of dummy metal wires disposed on the first plane and adjacent to a first terminal contact and a second terminal contact. The dummy metal wires are electrically independent from each other.

According to some embodiments, the wireless device further includes a metal block disposed in the first plane, and the dummy metal wires surround the metal block and are electrically independent from the metal block.

According to some embodiments, the wireless device further includes at least one electronic component and a plurality of dummy metal wires. The at least one electronic component is disposed in the second plane. The plurality of dummy metal wires is disposed on the first plane corresponding to a position of the electronic component.

According to some embodiments, a width of an innermost turn of the first spiral structure is narrower than a width of an outermost turn of the first spiral structure.

According to some embodiments, the first spiral structure has an intermediate turn disposed between the innermost turn and the outermost turn. A first slit is formed on the intermediate turn, and the first slit divides the intermediate turn into a left portion and a right portion, and a width of the left portion or the right portion is smaller than the width of the innermost turn of the first spiral structure.

According to some embodiments, a width of each turn of the first spiral structure gradually increases from the innermost turn to the outermost turn.

According to some embodiments, the first metal wire includes a plurality of straight sections and a plurality of curved sections, and a width of each curved section is greater than a width of a straight section connected thereto.

According to some embodiments of the disclosure, the first metal wire has a plurality of slits respectively formed on the curved sections.

According to some embodiments of the disclosure, a winding direction of the first metal wire is opposite to a winding direction of the second metal wire.

The present disclosure provides a wireless device including a coil assembly. In some embodiments, the coil assembly may include a first coil and a second coil, and the first coil is connected to the second coil in series. In addition, the first coil is connected to a first contact and a second contact, and the second coil is connected to the second contact and a third contact. That is, the second contact is connected between the first coil and the second coil.

Therefore, the first contact, the first coil, and the second contact can form a first circuit loop, and the first contact, the first coil, the second coil and the third contact can form a second circuit loop. The first circuit loop operates in a near field communication (NFC) band, and the second circuit loop operates as a transmitting terminal or a receiving terminal in electrical power transmission to perform wireless charging. As a result, the wireless device can perform the functions of wireless communication and wireless charging at the same time.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

Figure 1:
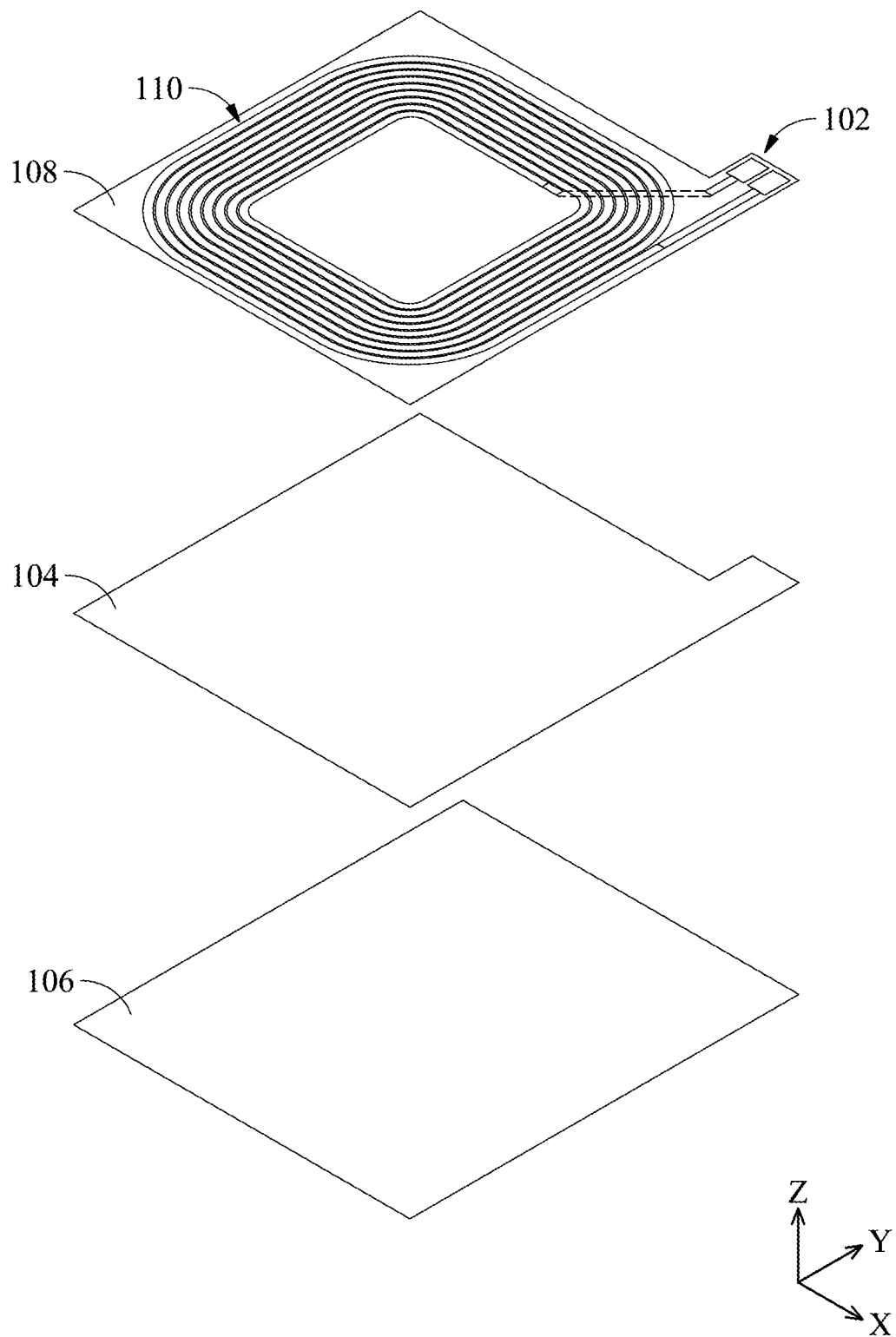
FIG. 1 is an exploded view of a wireless device in accordance with an embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

It should be understood that component for specific description or specific figures can be present in any form with which a skilled person is familiar. In addition, when a layer is "above" other layers or a substrate, it might be "directly" on the layers or the substrate, or some other layers may be between the layer and the other layers.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

Please refer to FIG. 1, which is an exploded view of a wireless device 100 in accordance with an embodiment of the present disclosure. As shown in FIG. 1, the wireless device 100 can include a coil assembly 102, an adhesive layer 104 and a magnetic conductive plate 106. In this embodiment, the coil assembly 102 is disposed on the magnetic conductive plate 106, and the coil assembly 102 is connected to the magnetic conductive plate 106 by the adhesive layer 104. The adhesive layer 104 can be a tape or any other material that can be used for connection.

In addition, in this embodiment, the magnetic conductive plate 106 may be a ferrite, but it is not limited thereto. For example, in other embodiments, the magnetic conductive plate 106 may also include a nanocrystalline material. The magnetic conductive plate 106 may have a magnetic permeability corresponding to the coil assembly 102 so that the electromagnetic waves of the coil assembly 102 can be more concentrated.

As shown in FIG. 1, the coil assembly 102 includes a substrate 108 and a coil structure 110, and the coil structure 110 is formed on the substrate 108. In this embodiment, the substrate 108 is a flexible circuit board, but it is not limited thereto. Any substrate that can be used to form the coil structure 110 is within the scope of the present disclosure. Furthermore, the coil assembly 102 can function as a charging coil for wirelessly charging an external electronic device, such as a tablet computer or a smart phone.

For example, the coil structure 110 of coil assembly 102 can operate as a resonant charging coil based on the standard of the Alliance for Wireless Power (A4WP), but it is not limited thereto. In addition, the coil structure 110 can operate as an inductive charging coil based on the standard of Wireless Power Consortium (WPC), such as the Qi standard. Therefore, the wireless device 100 in this embodiment can respond to different forms of charging so as to enlarge the range of applications. For example, in the case of a close distance (for example, 1 cm or less), the inductive type of operation is used; and at a long distance, a resonance type of operation is used.

Figure 2:
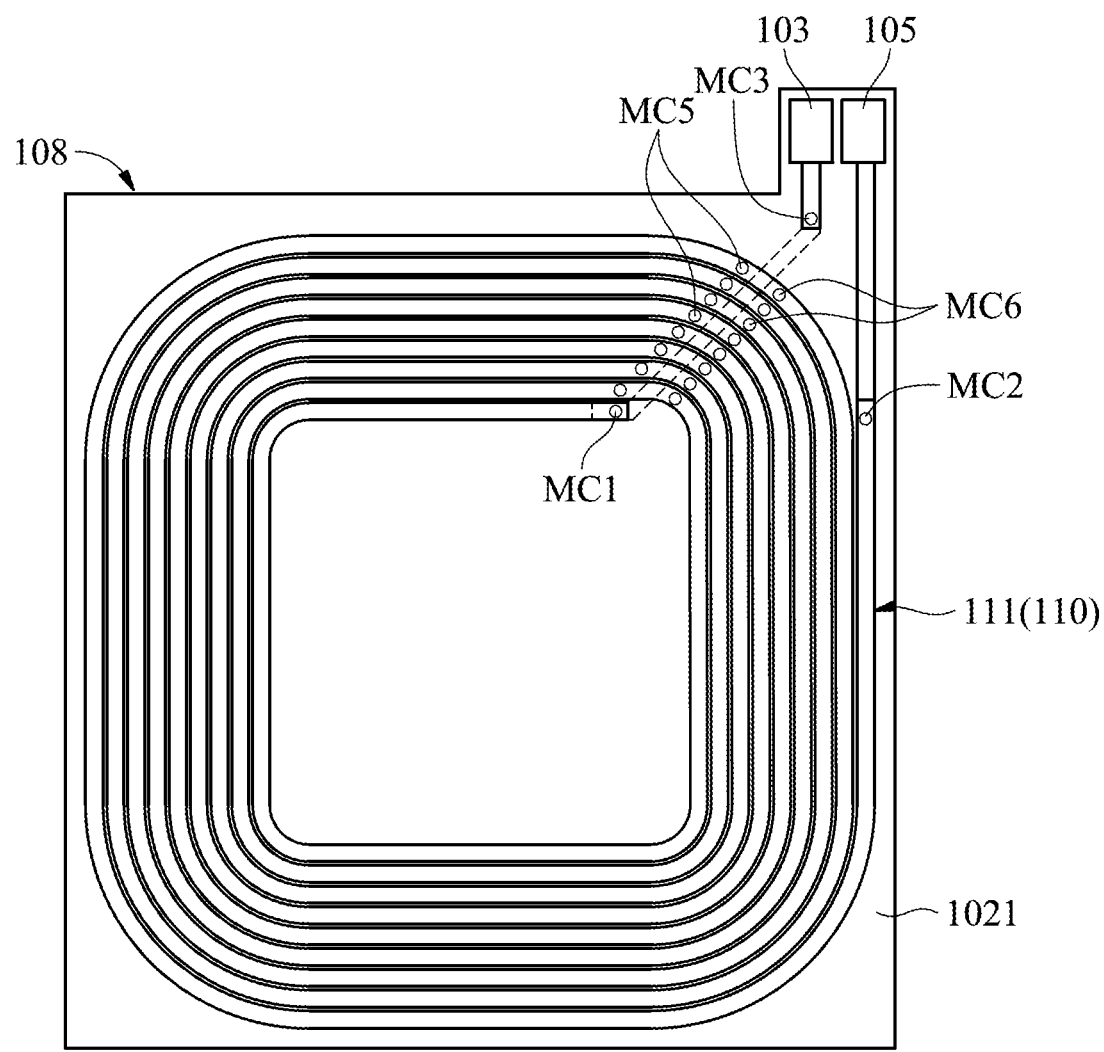
FIG. 2 is a top view of the coil assembly according to an embodiment of the present disclosure.
Figure 3:
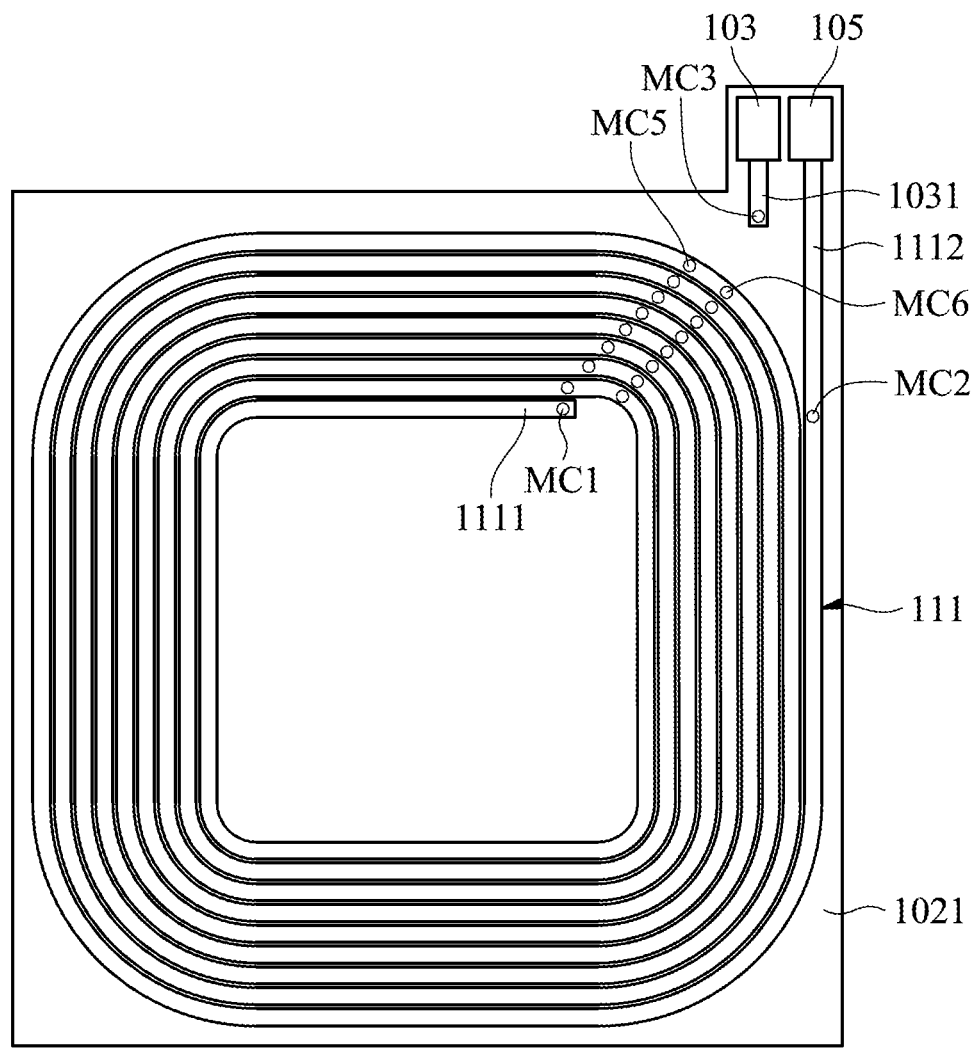
FIG. 3 is a schematic diagram of the structure of the coil assembly on a first plane according to an embodiment of the present disclosure.
Figure 4:
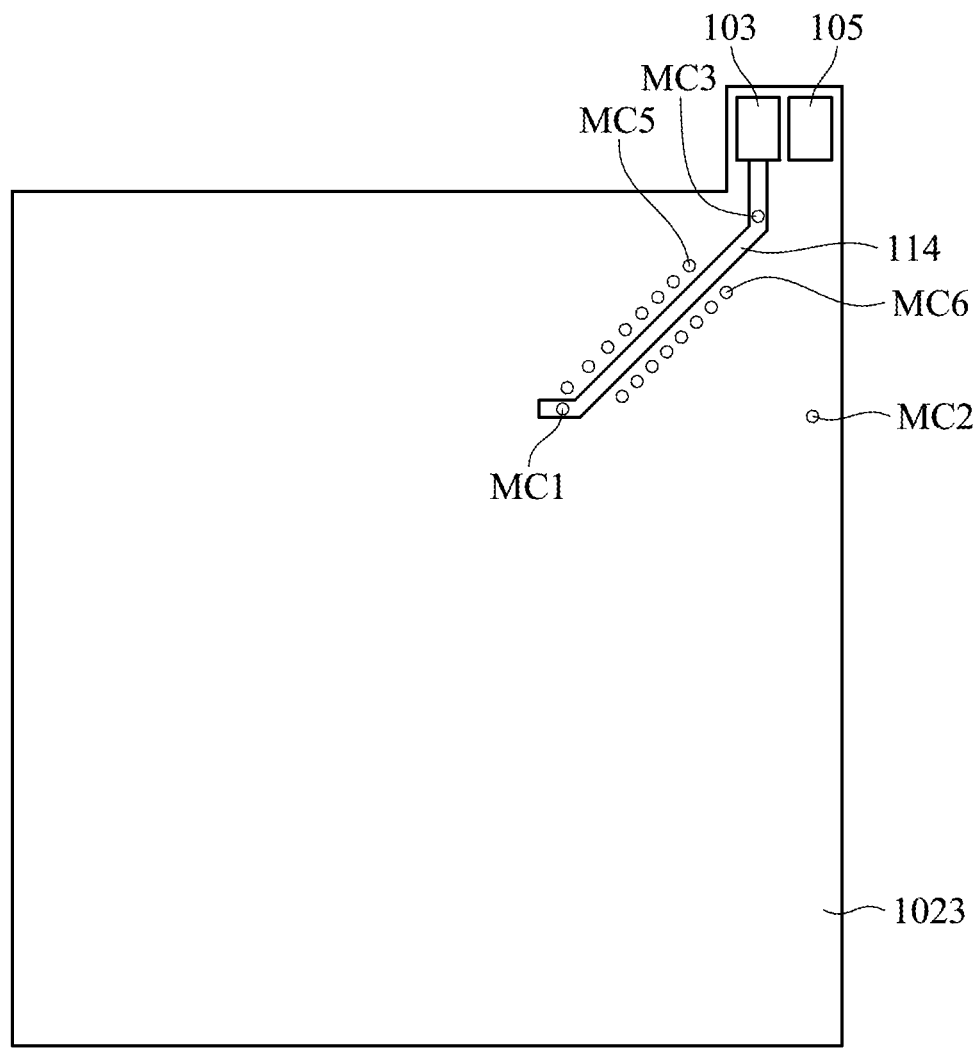
FIG. 4 is a schematic diagram of the structure of the coil assembly on a third plane according to this embodiment of the present disclosure.
Figure 5:
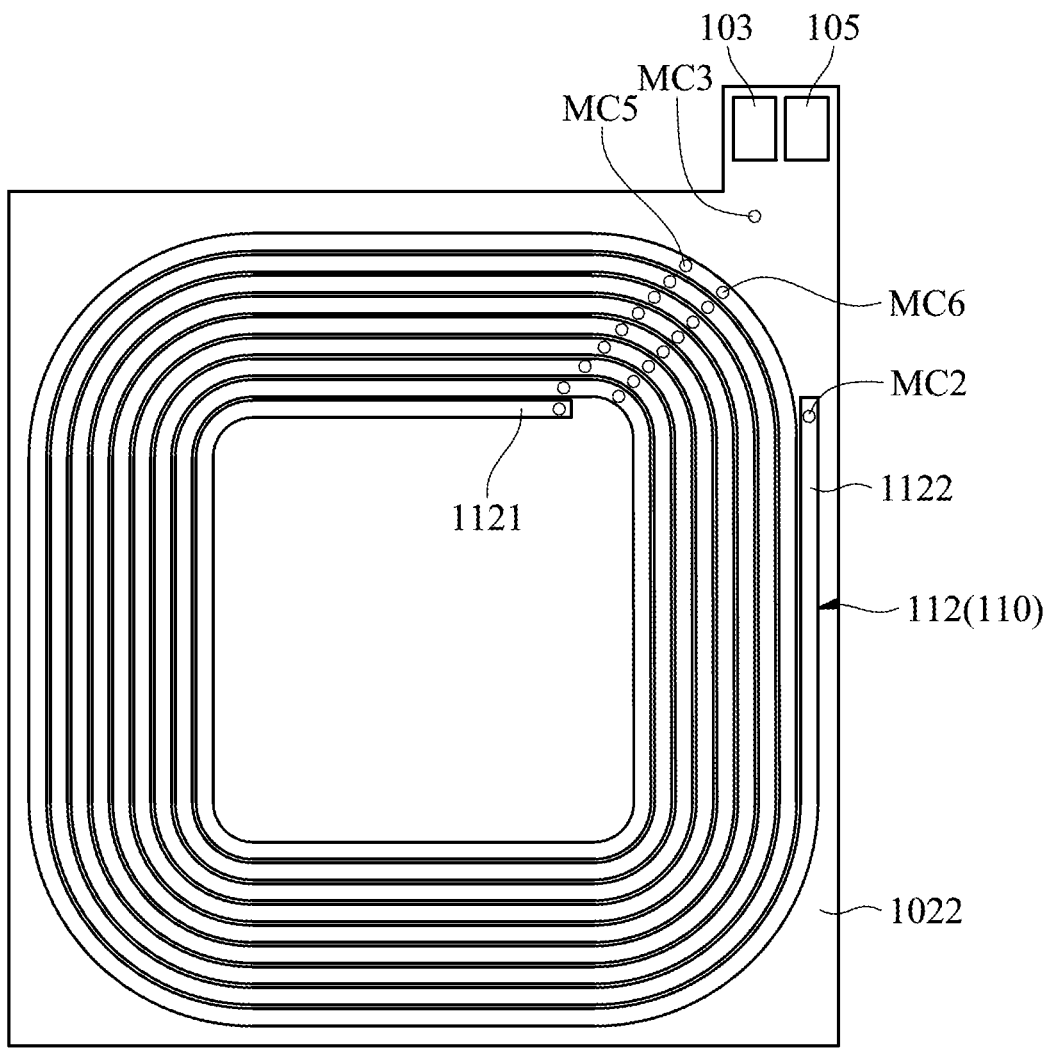
FIG. 5 is a schematic diagram of the structure of the coil assembly on a second plane according to this embodiment of the present disclosure.

Next, please refer to FIG. 2 to FIG. 5. FIG. 2 is a top view of the coil assembly 102 according to an embodiment of the present disclosure. FIG. 3 is a schematic diagram of the structure of the coil assembly 102 on a first plane 1021 according to an embodiment of the present disclosure. FIG. 4 is a schematic diagram of the structure of the coil assembly 102 on a third plane 1023 according to this embodiment of the present disclosure. FIG. 5 is a schematic diagram of the structure of the coil assembly 102 on a second plane 1022 according to this embodiment of the present disclosure.

In this embodiment, the substrate 108 of the coil assembly 102 includes a first layer structure, a second layer structure and a third layer structure which are respectively located in the first plane 1021, the second plane 1022 and the third plane 1023, and the third plane 1023 is located between the first plane 1021 and the second plane 1022. It should be noted that the coil structure 110 in FIG. 5 is located below the second plane 1022, but for the sake of clarity, the coil structure 110 in FIG. 5 is still illustrated by a solid line.

As shown in FIG. 3 to FIG. 5, the coil structure 110 (the first coil) of the coil assembly 102 may include a first metal wire 111 and a second metal wire 112 and a connecting member 114, the first metal wire 111 is disposed on the first plane 1021, the second metal wire 112 is disposed on the second plane 1022, and the connecting member 114 is disposed on the third plane 1023. In addition, as shown in FIG. 2, the coil assembly 102 can further have a first terminal contact 103 and a second terminal contact 105, configured to be electrically connected to an external circuit, such as a control chip.

Next, as shown in FIG. 3, the first metal wire 111 forms a first spiral structure which has a first end 1111 and a second end 1112, and the second end 1112 is connected to the second terminal contact 105. As shown in FIG. 4, one end of the connecting member 114 is connected to the first terminal contact 103. In addition, as shown in FIG. 5, the second metal wire 112 forms a second spiral structure which has a first end 1121 and a second end 1122. It should be noted that, in this embodiment, the first metal wire 111 and the second metal wire 112 are continuously extended.

Furthermore, the coil assembly 102 may further include a plurality of metal connectors (also referred to as vias) configured to penetrate the substrate 108 to connect the first metal wire 111 and the second metal wire 112. For example, as shown in FIG. 2 to FIG. 5, the coil assembly 102 includes a metal connector MC1 and a metal connector MC2. The metal connector MC1 is configured to connect the first end 1111 of the first metal wire 111, the connecting member 114 and the first end 1121 of the second metal wire 112. Furthermore, the second end 1122 of the second metal wire 112 is electrically connected to the first metal wire 111 by the metal connector MC2.

As shown in FIG. 3 and FIG. 4, the coil assembly 102 further includes a metal connector MC3 configured to connect the connecting member 114 and an extending wire 1031. In addition, the coil assembly 102 further includes a plurality of metal connectors MC5 and metal connectors MC6 disposed around the connecting member 114. As shown in FIG. 2 to FIG. 5, the plurality of metal connectors MC5 and metal connectors MC6 are respectively disposed on both sides of the connecting member 114. The metal connectors MC5 and the metal connectors MC6 are configured to electrically connect the first metal wire 111 and the second metal wire 112, so that a portion of the first spiral structure of the first metal wire 111 and a portion of the second spiral of the second metal wire 112 may be connected in parallel. Therefore, it can achieve the effect of reducing the overall impedance of the coil assembly 102, and the number of turns of the coil assembly 102 can also be increased.

Based on the structural configuration of the coil assembly 102 of the present embodiment, the integrity of the first metal wire 111 and the second metal wire 112 can be maintained, and the structure of the first metal wire 111 or the second is not cut off by disposing the connecting member 114.

Figure 6:
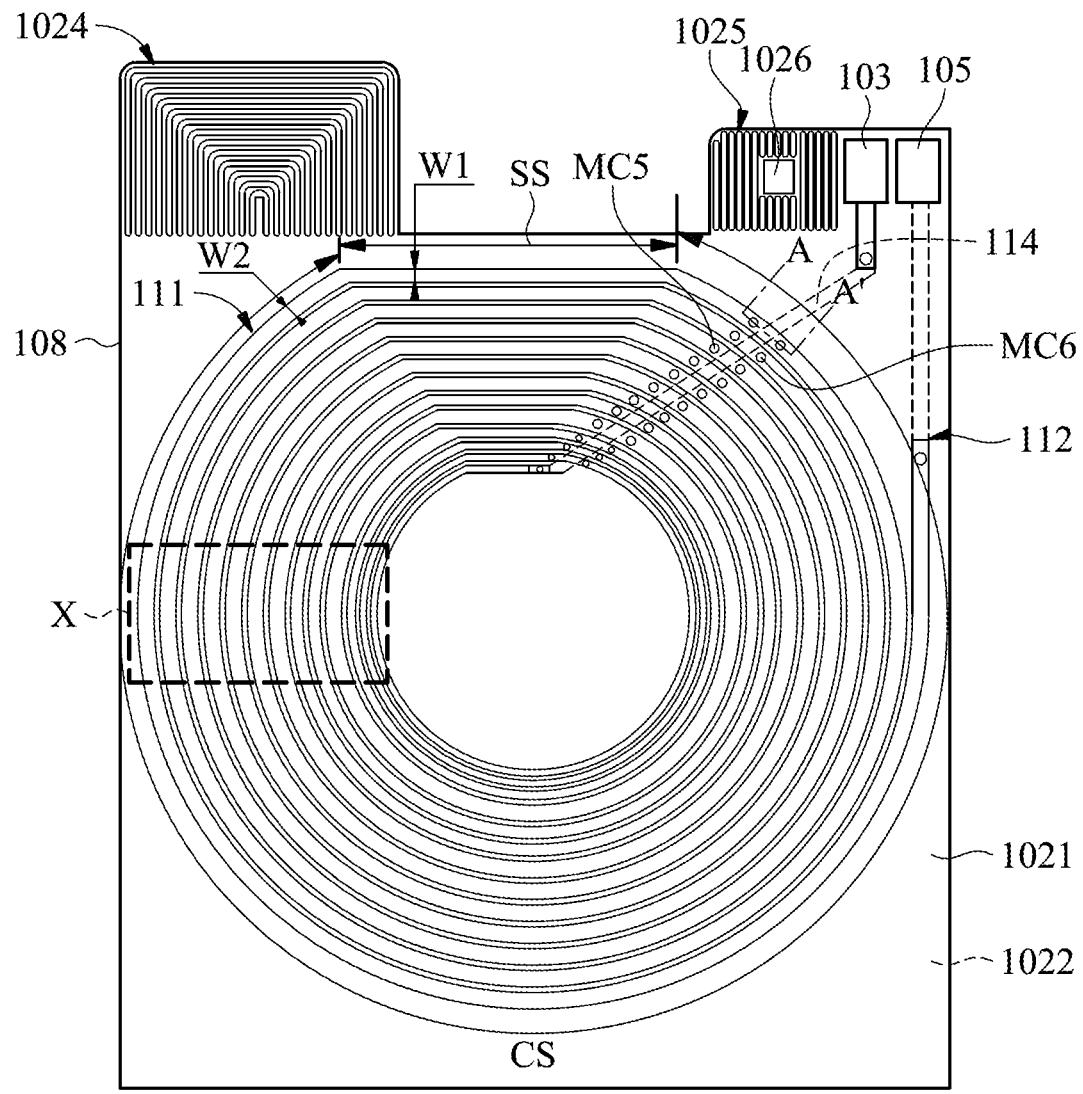
FIG. 6 is a top view of a coil assembly according to another embodiment of the present disclosure.

Next, please refer to FIG. 6, which is a top view of a coil assembly 102A according to another embodiment of the present disclosure. The coil assembly 102A is similar to the coil assembly 102, and their difference is that, in this embodiment, in order to enhance the overall strength of the coil assembly 102A, the coil assembly 102A may further include a plurality of dummy metal wires which is disposed on the first plane 1021. In this embodiment, the coil assembly 102A includes a plurality of dummy metal wires 1024 and dummy metal wires 1025, and the dummy metal wires 1025 are adjacent to the first terminal contact 103 and the second terminal contact 105. The dummy metal wires 1024 and the dummy metal wires 1025 are electrically independent from the first metal wire 111 and the second metal wire 112, and the plurality of dummy metal wires 1024 and the plurality of dummy metal wires 1025 are electrically independent from each other.

By disposing the dummy metal wires 1024 and the dummy metal wires 1025, the local hardness of the substrate 108 can be increased, and the dummy metal wires 1024 and the dummy metal wires 1025 can be used to assist the substrate 108 to be positioned so as to improve positioning accuracy and the convenience of assembly. In this embodiment, the dummy metal wires 1024 and the dummy metal wires 1025 are implemented by a line shape, but they are not limited thereto. For example, in other embodiments, they may also be implemented by a circular shape, a rectangular shape and so on.

Furthermore, in this embodiment, the coil assembly 102A may further include a metal block 1026 disposed on the first plane 1021 to further increase the overall strength of the coil assembly 102A. In addition, the plurality of dummy metal wires 1025 surrounds the metal block 1026 and is electrically independent from the metal block 1026.

In addition, in the embodiment of the present disclosure, the coil assembly 102A may further include at least one electronic component (not shown in the figures) disposed on the second plane 1022, and the electronic component is disposed on a position corresponding to the position of the metal block 1026 and some of the dummy metal wires 1025 on the first plane 1021. Therefore, the soldering contacts for soldering the electronic component are not easily damaged by the impact, thereby improving the reliability of the wireless device.

Figure 7:
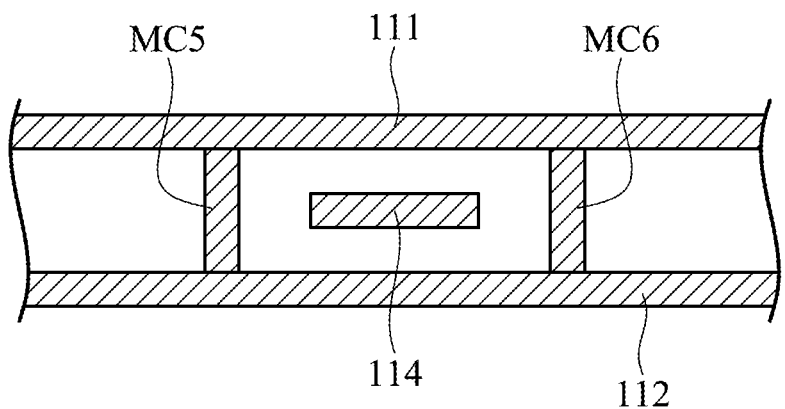
FIG. 7 is a cross-sectional view along the line in A-A' FIG. 6 according to the embodiment of the present disclosure.
Figure 7:
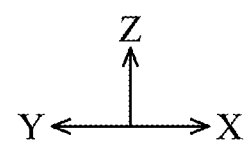

Please refer to FIG. 6 and FIG. 7 at the same time. FIG. 7 is a cross-sectional view along the line in A-A' FIG. 6 according to the embodiment of the present disclosure. In this embodiment, as shown in FIG. 6, the coil assembly 102 may further include a plurality of metal connectors MC5 and MC6 which are disposed on both sides of the connecting member 114. As shown in FIG. 7, the metal connectors MC5 and the metal connectors MC6 can connect a portion of the first spiral structure of the first metal wire 111 to a portion of the second spiral structure of the second metal wire 112 in parallel. Therefore, it can achieve the effect of reducing the overall impedance of the coil assembly 102A, and the number of turns of the coil assembly 102A can also be increased.

In addition, as shown in FIG. 6, the first metal wire 111 further includes a plurality of straight sections SS and a plurality of curved sections CS. In this embodiment, the width of each curved section CS is greater than the width of the straight section SS connected thereto. For example, as shown in FIG. 6, the outermost straight section SS has a width W1, the curved section CS connected thereto has a width W2, and the width W2 is greater than the width W1. Based on the structural design, the area of the coil assembly 102A can be reduced, so as to achieve the purpose of miniaturization of the wireless device.

Figure 8:
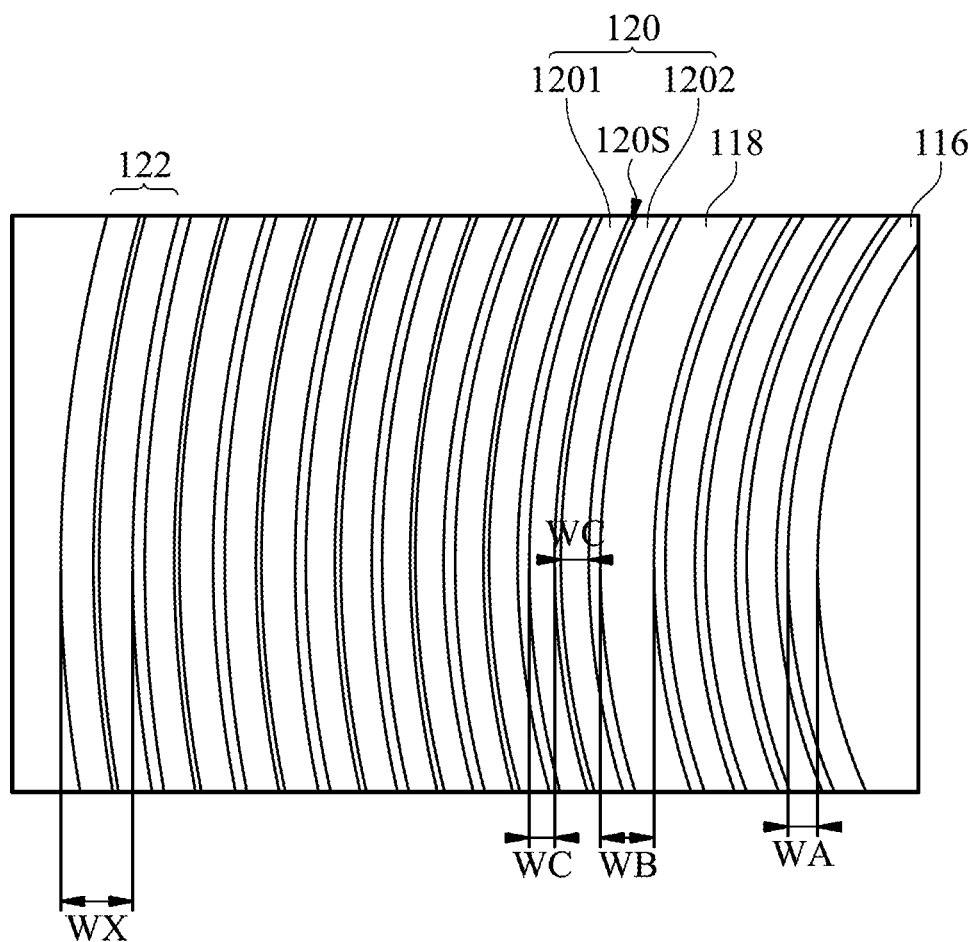
FIG. 8 is an enlarged diagram of a region X in FIG. 6 according to the embodiment of the present disclosure.

Next, please refer to FIG. 6 and FIG. 8. FIG. 8 is an enlarged diagram of a region X in FIG. 6 according to the embodiment of the present disclosure. As shown in FIG. 8, the first spiral structure has an innermost turn 116, a first intermediate turn 118, a second intermediate turn 120 and an outermost turn 122. The innermost turn 116 has a width WA, the outermost turn 122 has a width WX, and the width WA of the innermost turn 116 is narrower than the width WX of the outermost turn 122. In various embodiments of the present disclosure, the widths of different turns in the first metal wire 111 may be correspondingly modified according to the strength of the magnetic field. For example, a narrower width is adopted for a stronger magnetic field, so that the resistance value is higher, and therefore the loss due to the Eddy current can be reduced.

In this embodiment, a plurality of slits may be formed on the first spiral structure of the first metal wire 111, which are respectively formed on the curved sections CS. Specifically, as shown in FIG. 8, the first intermediate turn 118 and second intermediate turn 120 are disposed between the innermost turn 116 and the outermost turn 122, and a first slit 120S is formed on the second intermediate turn 120. In addition, the first slit 120S divides the second intermediate turn 120 into a left portion 1201 and a right portion 1202. Each of the left portion 1201 and the right portion 1202 has a width WC, and the width WC is smaller than the width WA of the innermost turn 116 of the first spiral structure.

Furthermore, in this embodiment, the width of the first metal wire 111 corresponds to the width of the second metal wire 112, and the width of each successive turn of the first spiral structure increases gradually from the innermost turn to the outermost turn. That is, the width WA is smaller than a width WB of the first intermediate turn 118, the width WB is smaller than the width WX of the outermost turn 122, and the width WC is smaller than the width WA. Based on the structural configuration of this embodiment, the loss due to Eddy current can be reduced, and the current density can be more uniform.

Figure 9:
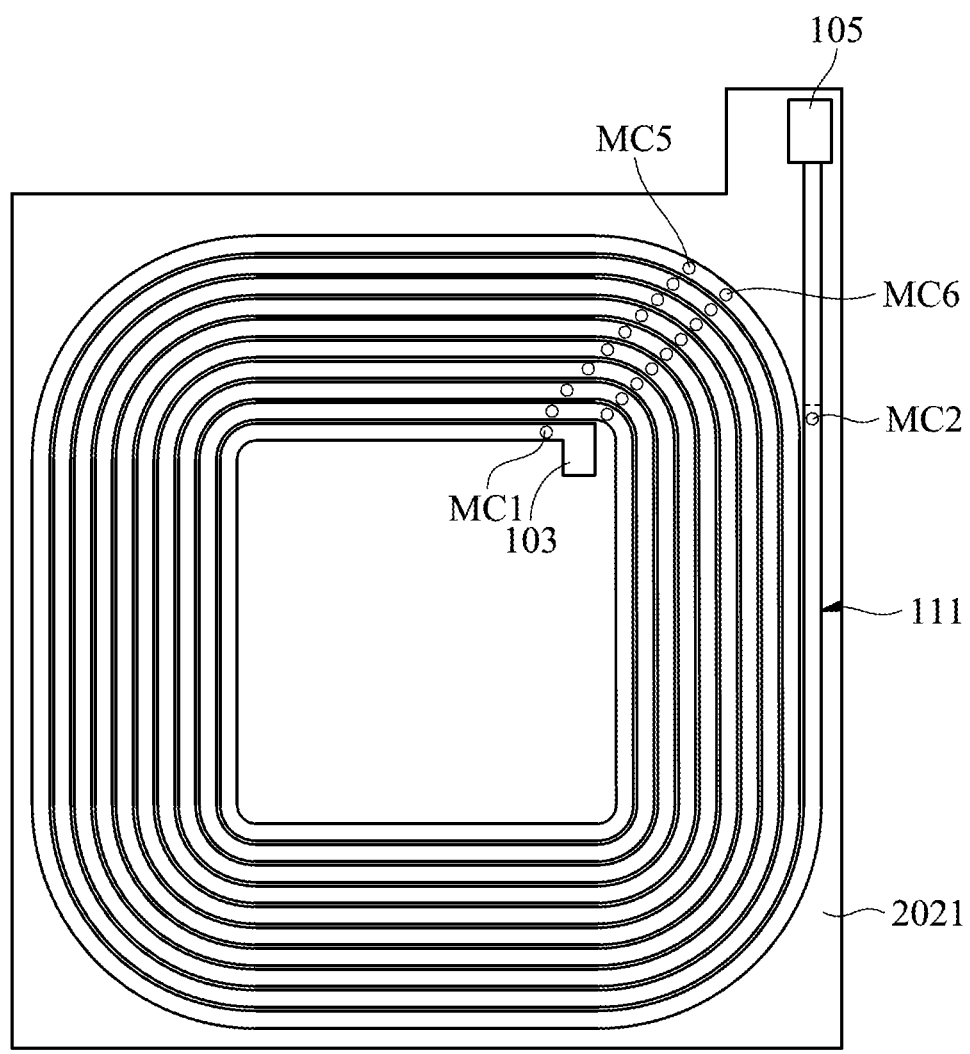
FIG. 9 is a top view of a coil assembly of a wireless device according to another embodiment of the present disclosure.
Figure 10:
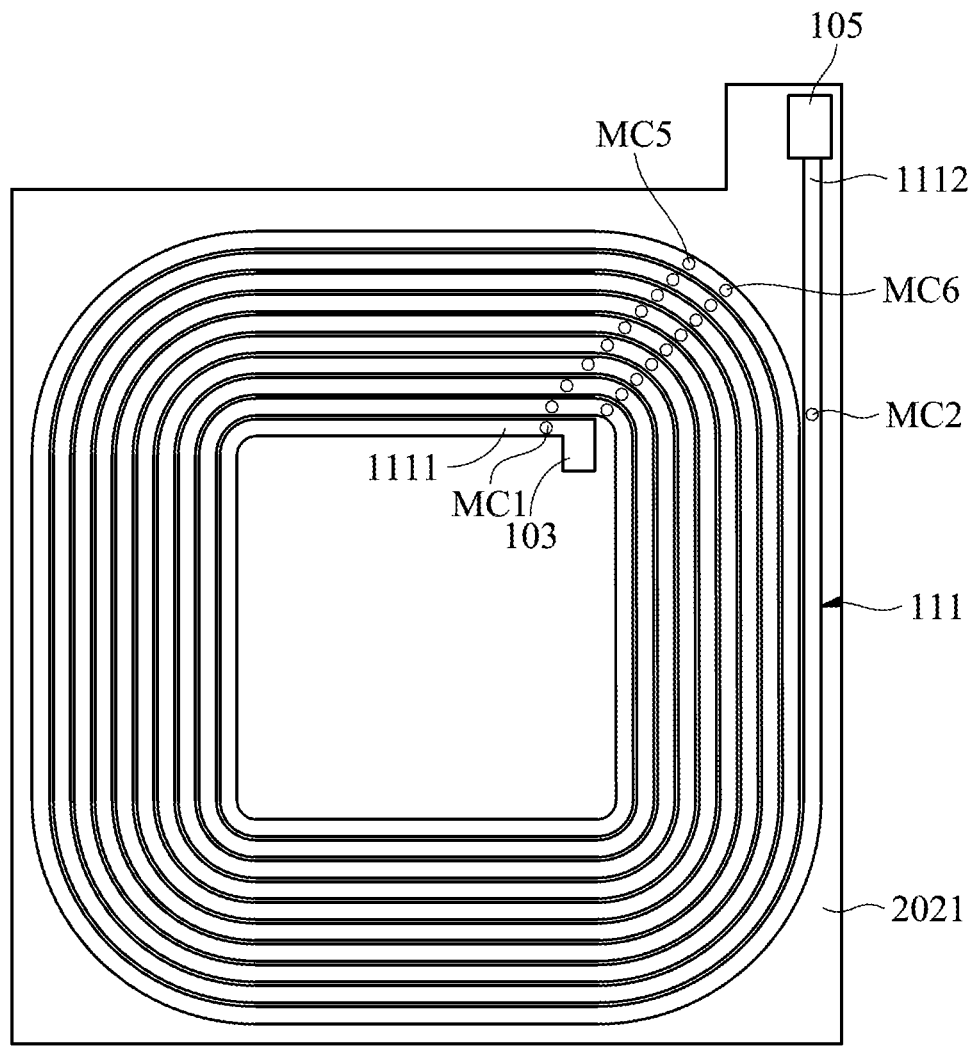
FIG. 10 is a schematic diagram of an upper layer structure of the coil assembly on a first plane according to the embodiment of the present disclosure.
Figure 11:
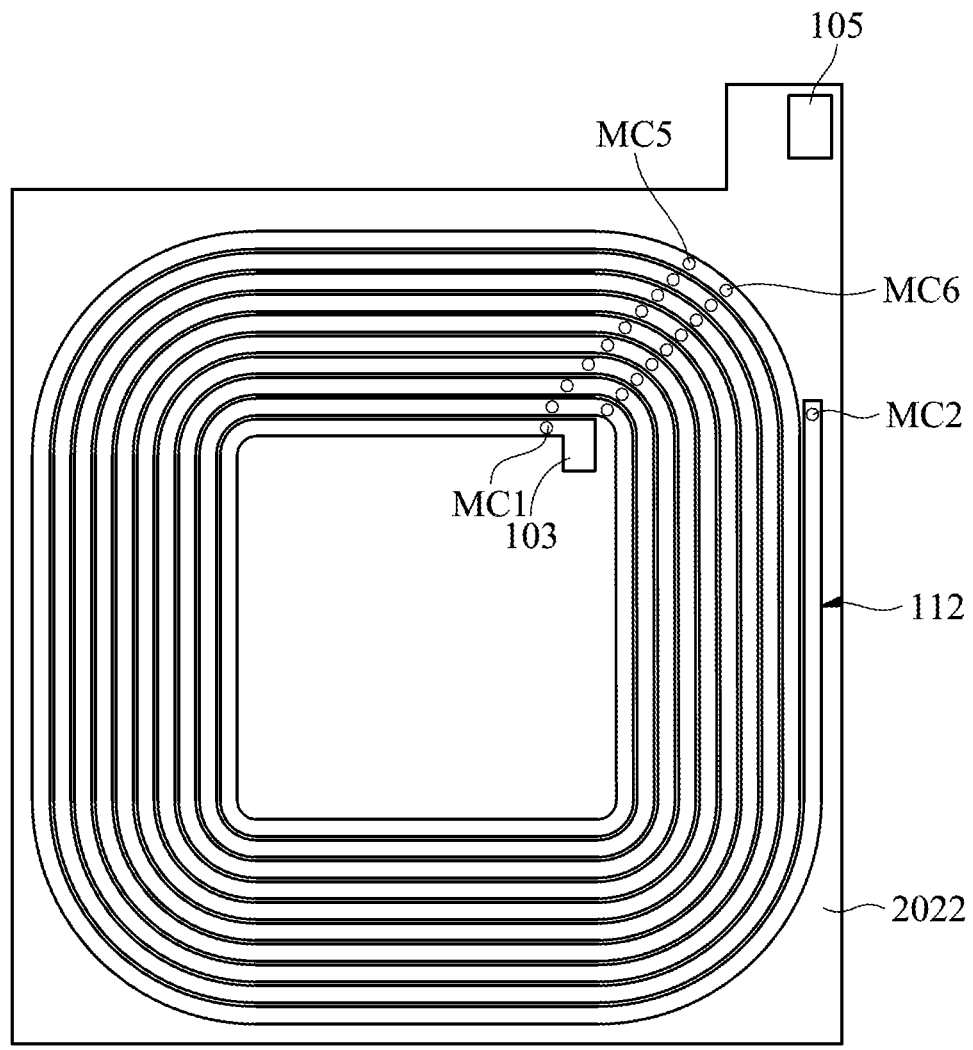
FIG. 11 is a schematic diagram of a lower layer structure of the coil assembly on a second plane according to this embodiment of the present disclosure.

Please refer to FIG. 9 to FIG. 11. FIG. 9 is a top view of a coil assembly 202 of a wireless device according to another embodiment of the present disclosure, FIG. 10 is a schematic diagram of an upper layer structure of the coil assembly 202 on a first plane 2021 according to the embodiment of the present disclosure, and FIG. 11 is a schematic diagram of a lower layer structure of the coil assembly 202 on a second plane 2022 according to this embodiment of the present disclosure.

The coil assembly 202 of this embodiment is similar to the coil assembly 102 described above. Their difference is that, as shown in FIG. 10, the first terminal contact 103 of the coil assembly 202 in this embodiment is disposed on the inner side of the first metal wire 111 (or the second metal wire 112), and the first terminal contact 103 is connected to the first end 1111 of the first metal wire 111. Furthermore, the second terminal contact 105 is disposed on the outer side of the first metal wire 111 and is connected to the second end 1112 of the first metal wire 111.

Based on the structural design of this embodiment, the coil assembly 202 can be electrically connected to an external circuit through the first terminal contact 103 to increase the convenience of testing the coil assembly 202. In addition, because the coil assembly 202 does not need to provide the connecting member 114 that cuts off the first metal wire 111 or the second metal wire 112, the integrity of the coil of the coil assembly 202 can be ensured.

Figure 12:
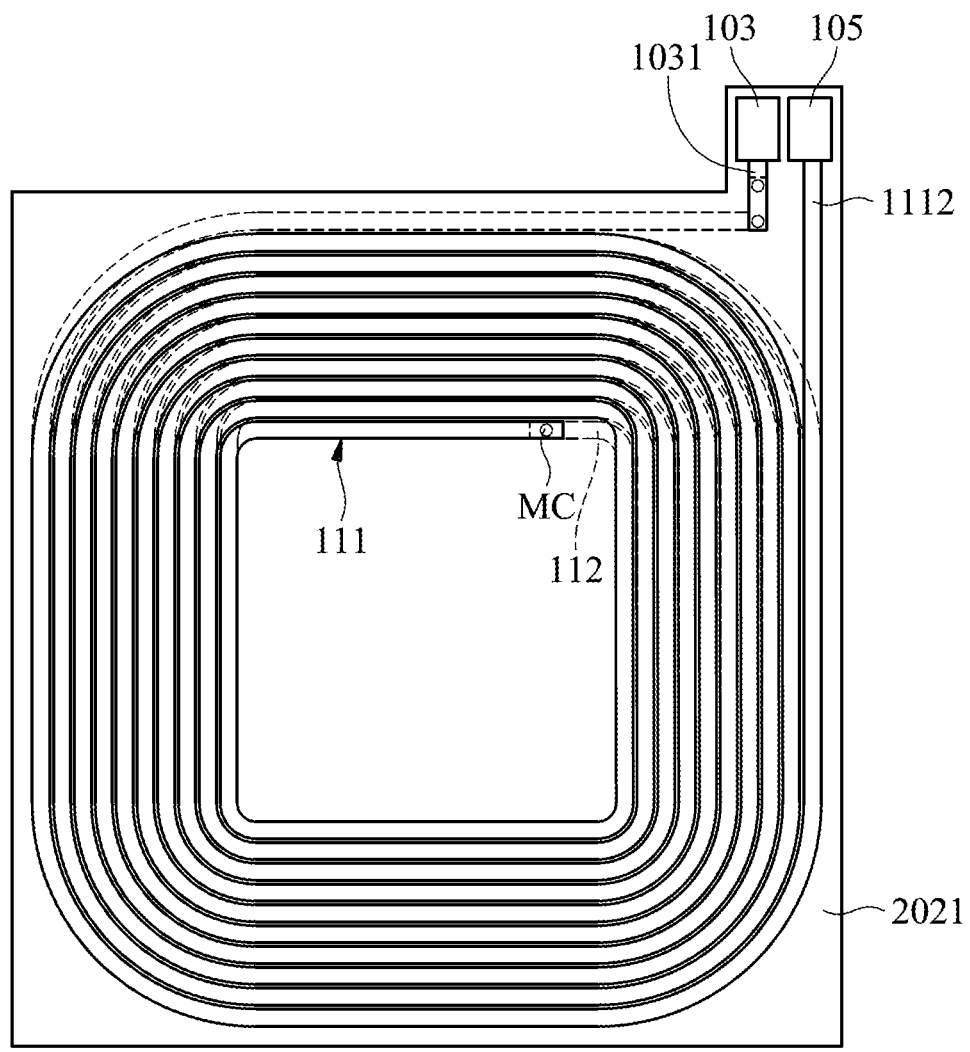
FIG. 12 is a top view of a coil assembly of a wireless device according to another embodiment of the present disclosure.
Figure 13:
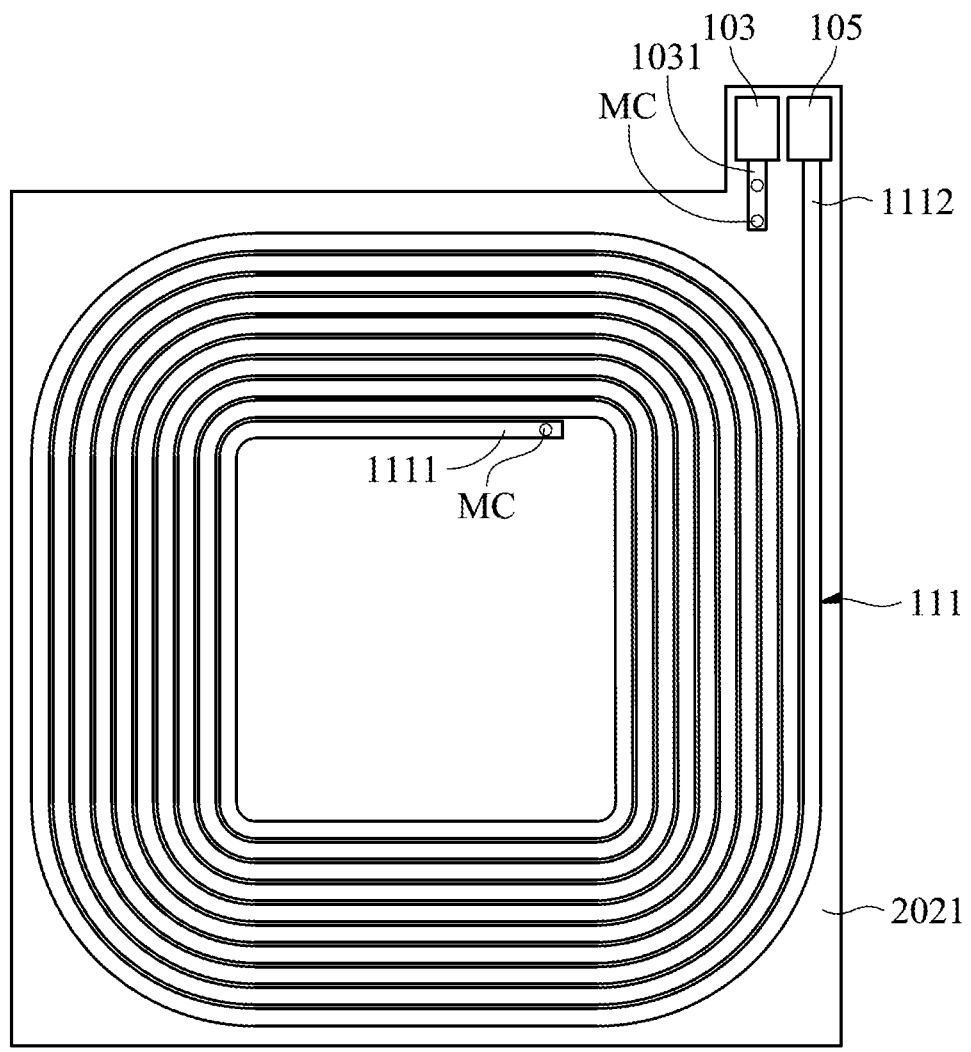
FIG. 13 is a schematic diagram of an upper layer structure of the coil assembly on the first plane according to the embodiment of the present disclosure.
Figure 14:
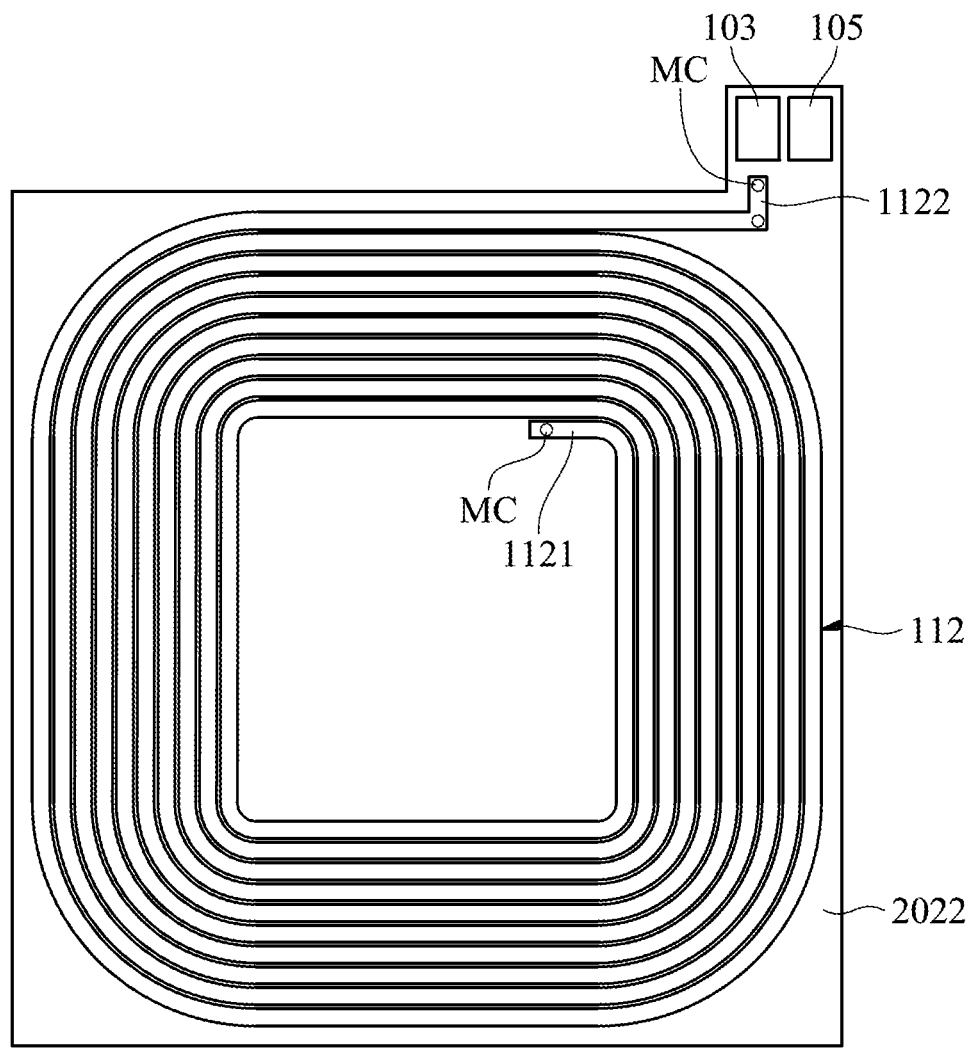
FIG. 14 is a schematic diagram of a lower layer structure of the coil assembly on the second plane according to this embodiment of the present disclosure.

Please refer to FIG. 12 to FIG. 14. FIG. 12 is a top view of a coil assembly 202A of a wireless device according to another embodiment of the present disclosure, FIG. 13 is a schematic diagram of an upper layer structure of the coil assembly 202A on the first plane 2021 according to the embodiment of the present disclosure, and FIG. 14 is a schematic diagram of a lower layer structure of the coil assembly 202A on the second plane 2022 according to this embodiment of the present disclosure.

The coil assembly 202A of this embodiment is similar to the coil assembly 202 described above, and their difference is that, in this embodiment, as shown in FIG. 13 and FIG. 14, the winding direction of the first metal wire 111 is opposite to the winding direction of the second metal wire 112, and they are connected to each other in series by the metal connector MC. The first end 1111 of the first metal wire 111 is electrically connected to the first end 1121 of the second metal wire 112 by the metal connector MC.

In addition, as shown in FIG. 12 and FIG. 14, the coil assembly 202A further has an extending wire 1031, and the second end 1122 of the second metal wire 112 is electrically connected to the extending wire 1031 and the first terminal contact 103 by the metal connector MC. Furthermore, as shown in FIG. 12 and FIG. 13, the second end 1112 of the first metal wire 111 is connected to the second terminal contact 105.

Based on the structural design of this embodiment, the working efficiency of the coil of the coil assembly 202A can be increased, the number of turns of the coil can be increased, and the overall resistance of the coil assembly 202A can be reduced.

In addition, in other embodiments of the present disclosure, a plurality of coil assemblies 202A may be stacked so that the plurality of coil assemblies 202A are connected with each other in parallel by the first terminal contact 103 and the second terminal contact 105, so as to achieve the purpose of increasing the number of turns of the coil and reducing the overall resistance.

Figure 15:
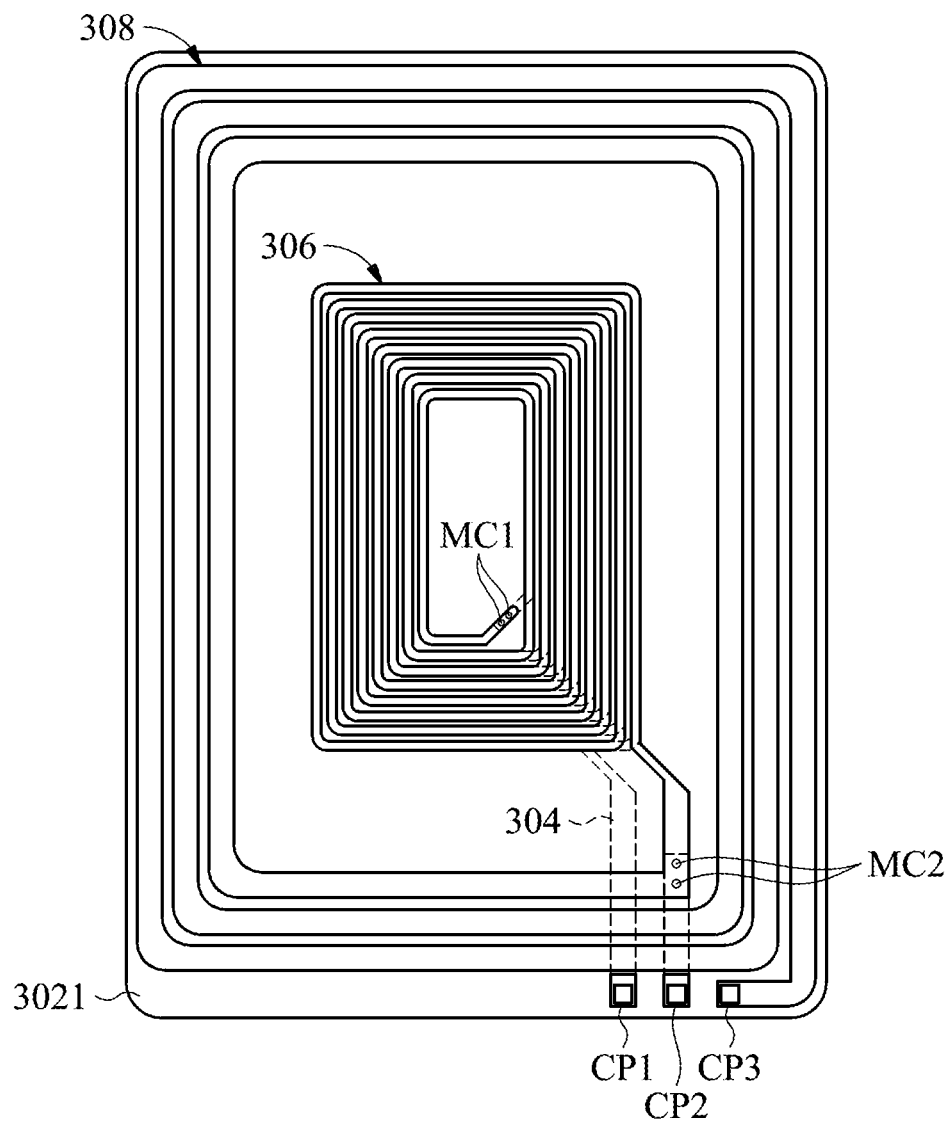
FIG. 15 is a top view of a coil assembly of a wireless device according to another embodiment of the present disclosure.
Figure 16:
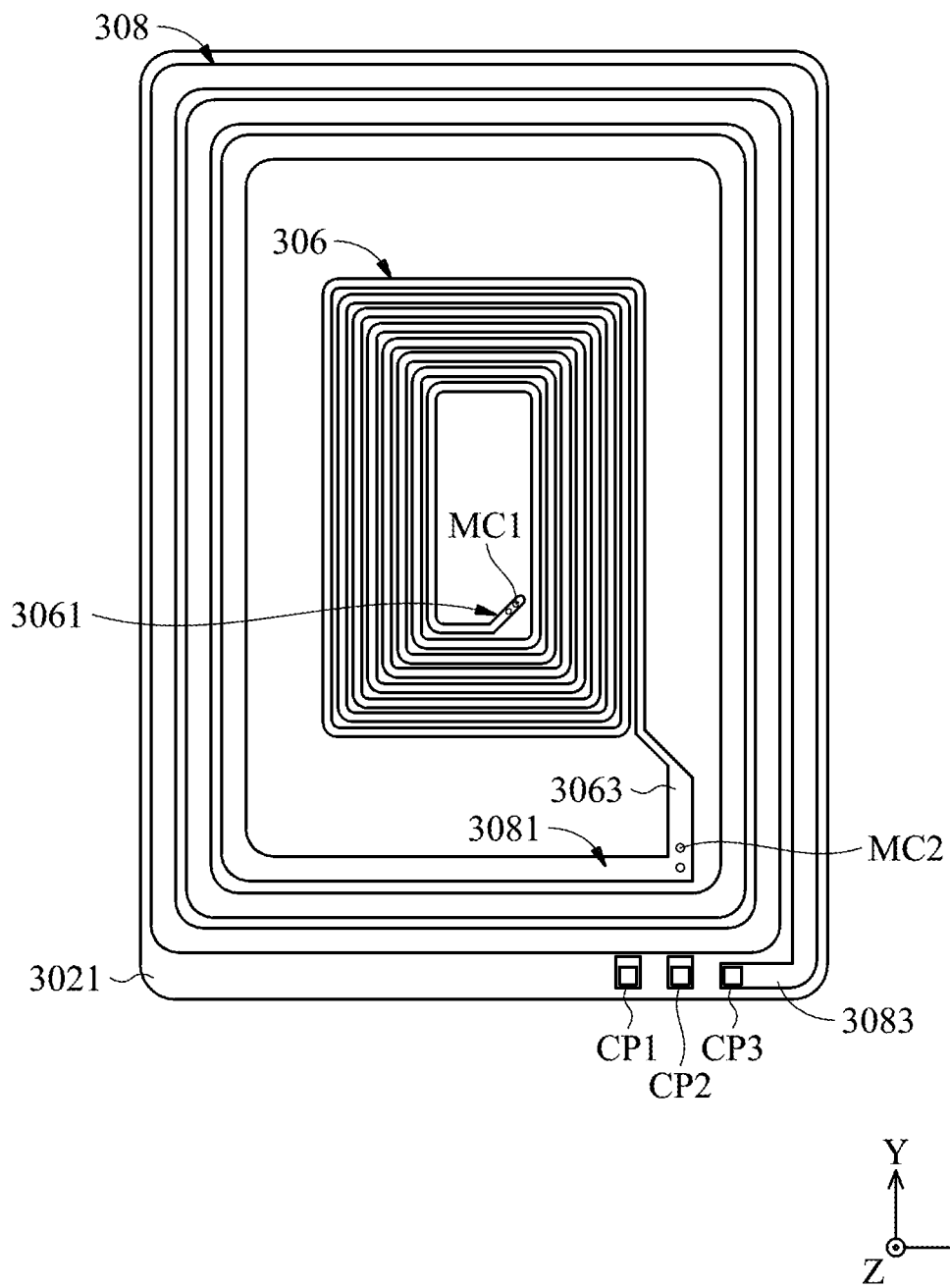
FIG. 16 is a schematic diagram of an upper layer structure of the coil assembly on a first plane according to the embodiment of the present disclosure.
Figure 17:
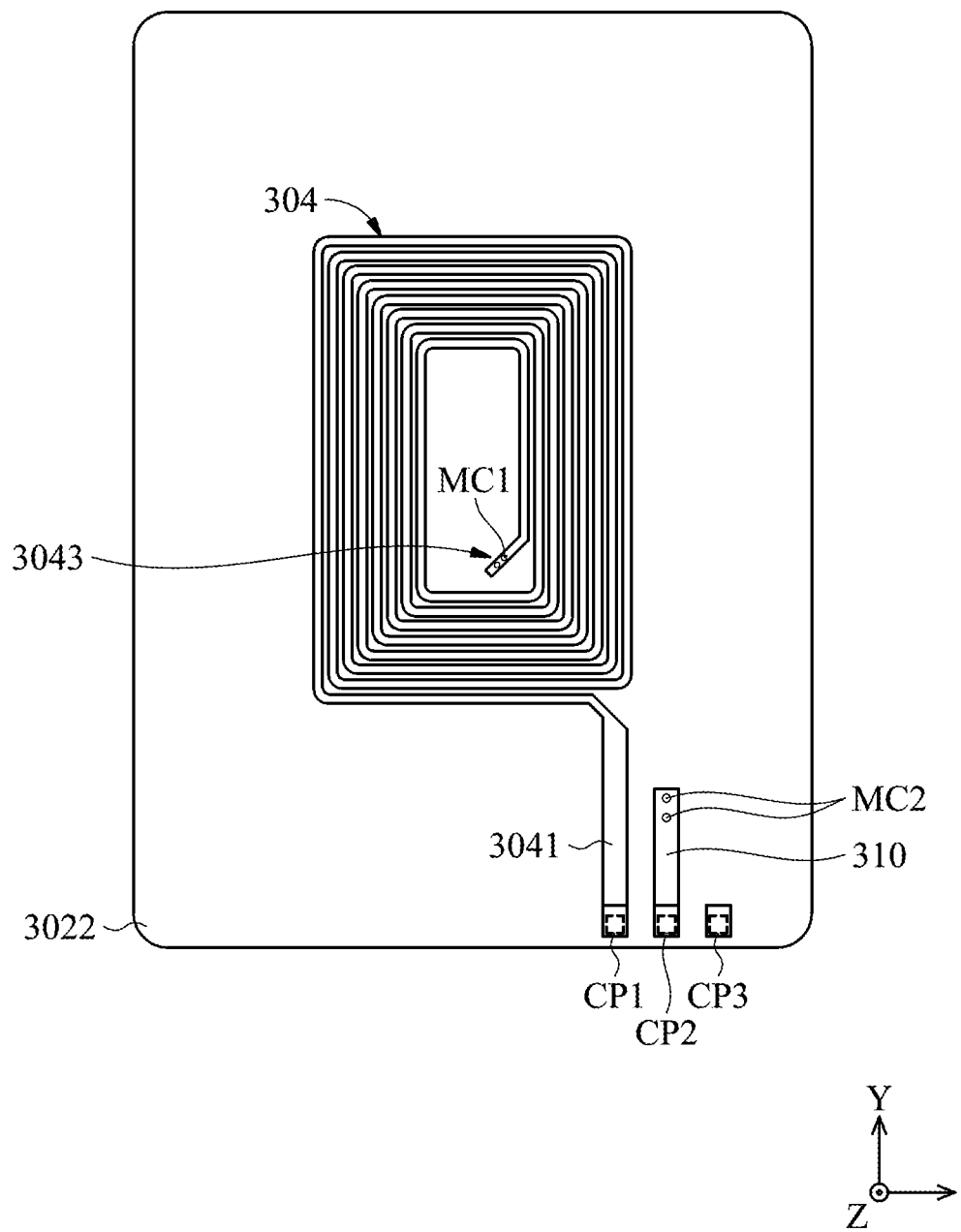
FIG. 17 is a schematic diagram of a lower layer structure of the coil assembly on a second plane according to this embodiment of the present disclosure.

Please refer to FIG. 15 to FIG. 17. FIG. 15 is a top view of a coil assembly 302 of a wireless device according to another embodiment of the present disclosure, FIG. 16 is a schematic diagram of an upper layer structure of the coil assembly 302 on a first plane 3021 according to the embodiment of the present disclosure, and FIG. 17 is a schematic diagram of a lower layer structure of the coil assembly 302 on a second plane 3022 according to this embodiment of the present disclosure.

In this embodiment, the coil component 302 of the wireless device includes a first coil, a second coil, a first contact CP1, a second contact CP2, and a third contact CP3. The first coil includes a first metal wire 304 and a second metal wire 306 which are respectively disposed on the second plane 3022 and the first plane 3021. In addition, the second coil includes a third metal wire 308, and the third metal wire 308 is disposed on the first plane 3021 and surrounds the second metal wire 306 (a portion of the first coil).

In this embodiment, as shown in FIG. 17, the first metal wire 304 of the first coil has a first end 3041, and the first contact CP1 is configured to be connected to the first end 3041 of the first coil. Next, the first metal wire 304 forms a first spiral structure having an end portion 3043 located inside the first spiral structure. The end portion 3043 of the first metal wire 304 is electrically connected to an end portion 3061 of the second metal wire 306 in FIG. 16 by one or more metal connectors MC1.

As shown in FIG. 16, the second metal wire 306 forms a second spiral structure, and the second metal wire 306 of the first coil has a second end 3063 disposed outside the second spiral structure. Furthermore, the third metal wire 308 of the second coil has a first end 3081 and a second end 3083. The first end 3081 is connected to the second end 3063 of the second metal wire 306 so that the second coil is connected to the first coil in series. In addition, the third contact CP3 is configured to be connected to the second end 3083 of the second coil.

In addition, as shown in FIG. 15 to FIG. 17, the second contact CP2 is configured to be electrically connected to the second end 3063 of the second metal wire 306 and the first end 3081 of the third metal wire 308 by a connecting wire 310 and two metal connectors MC2. That is, the second contact CP2 is configured to be connected between the first coil and the second coil.

Thus, in this embodiment, the first contact CP1, the first coil, and the second contact CP2 can form a first circuit loop, and the first contact CP1, the first coil, the second coil and the first third contacts CP3 can form a second circuit loop. It should be noted that, in this embodiment, the first circuit loop operates in a near field communication (NFC) band, and the second circuit loop operates as either a transmitting terminal or a receiving terminal for electrical power transmission in wireless charging.

Based on the structural design of the coil assembly 302, the wireless device can perform the functions of wireless communication and wireless charging at the same time, and the purpose of miniaturization of the wireless device can also be achieved. In addition, the connection manner of the first coil and the second coil can also be modified according to practical needs. For example, the first contact CP1, the second contact CP2, and the third contact CP3 can be electrically connected to an external control circuit (for example, a control chip). The external control circuit can control the first coil by the first contact CP1 and the second contact CP2, and can control the second coil by the second contact CP2 and the third contact CP3, or can control the first coil and the second coil in series by the first contact CP1 and the third contact CP3.

Figure 18:
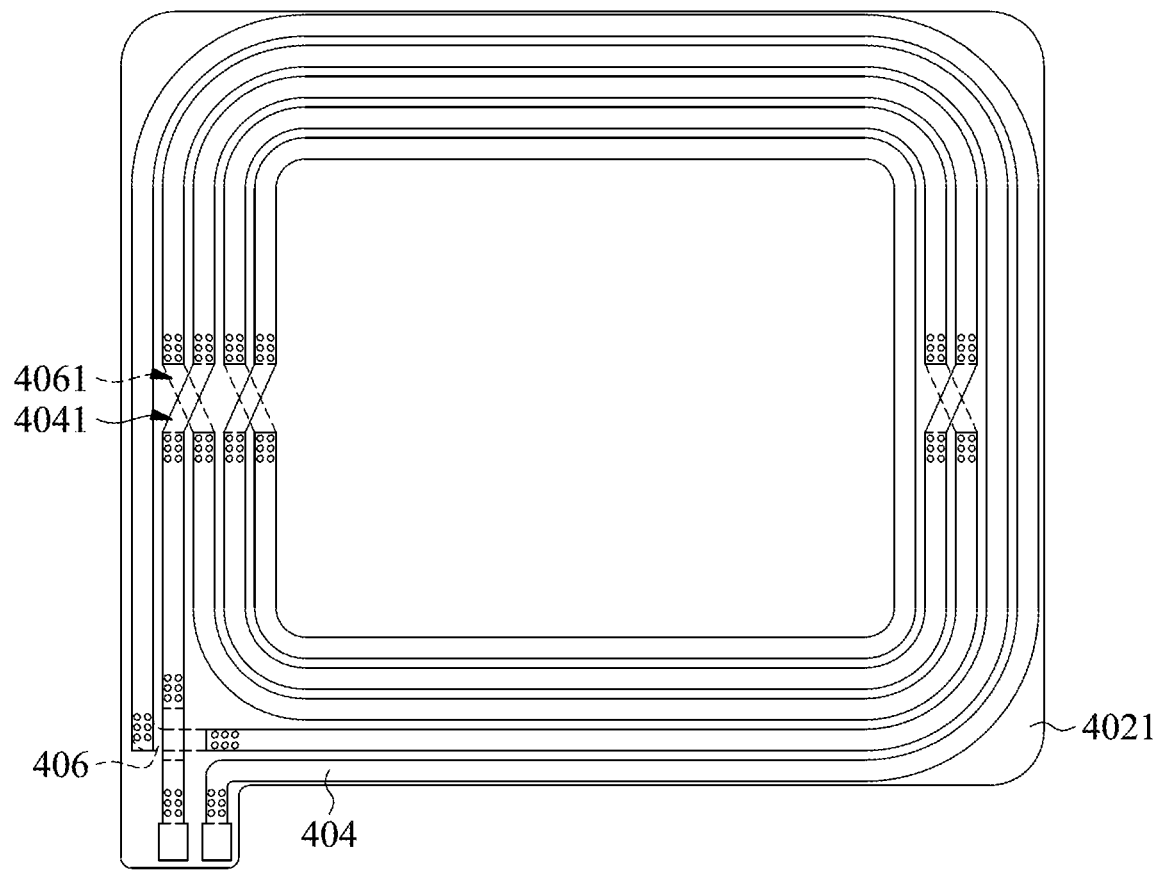
FIG. 18 is a top view of a coil assembly of a wireless device according to another embodiment of the present disclosure.
Figure 19:
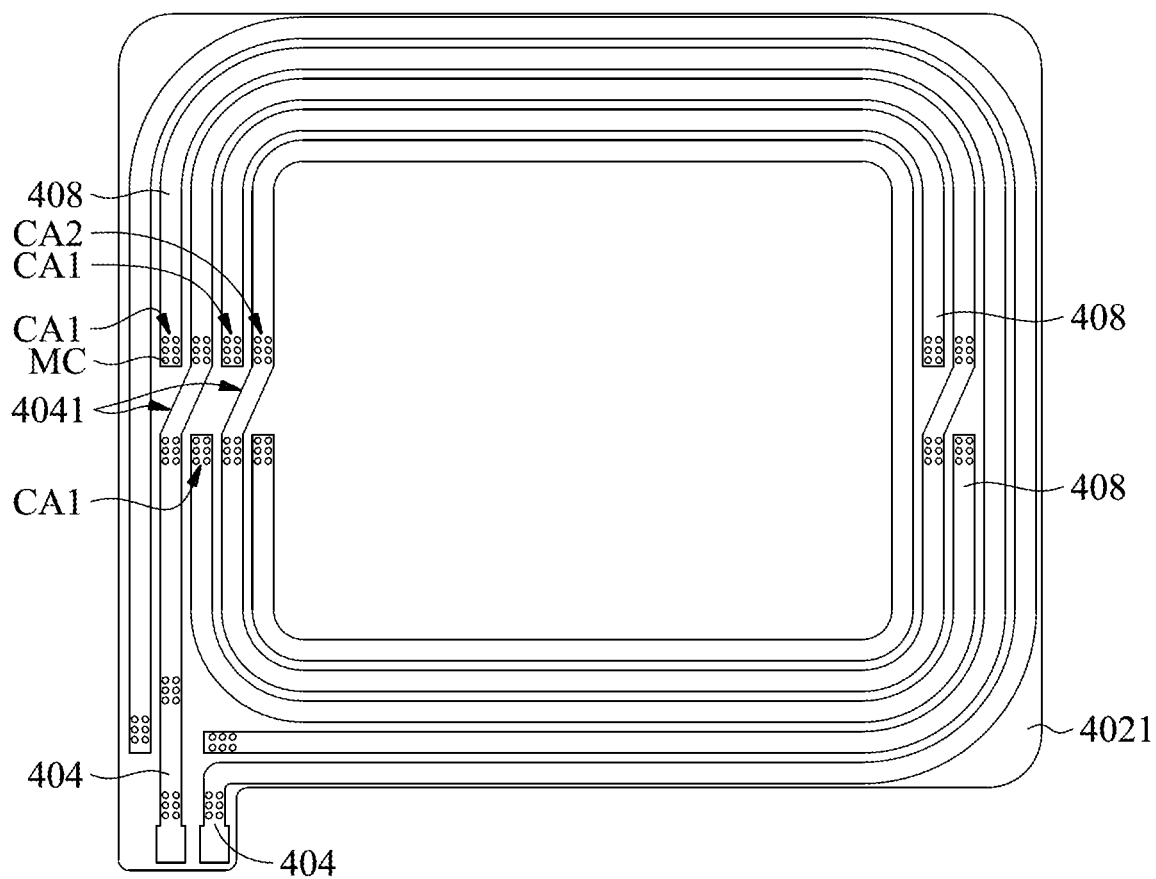
FIG. 19 is a schematic diagram of an upper layer structure of the coil assembly on a first plane according to the embodiment of the present disclosure.
Figure 19:
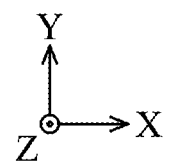
Figure 20:
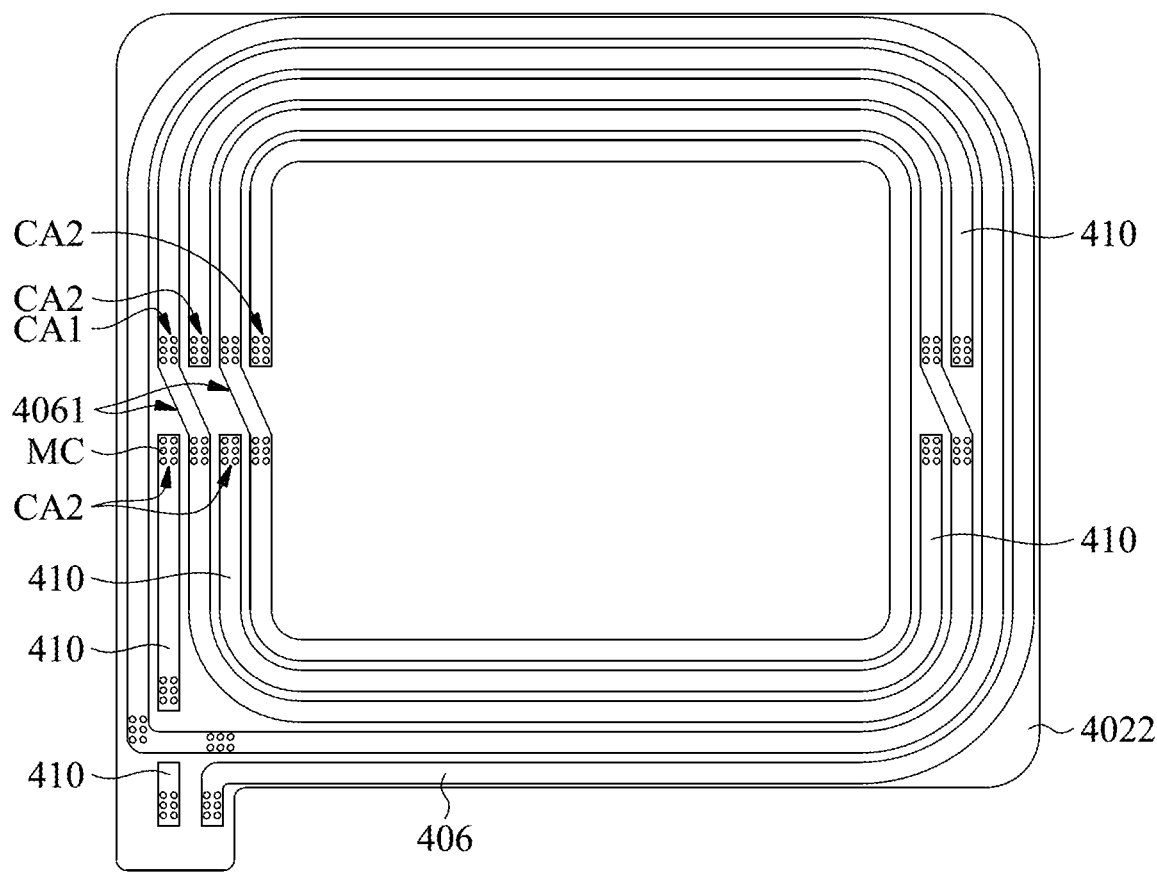
FIG. 20 is a schematic diagram of a lower layer structure of the coil assembly on a second plane according to the embodiment of the present disclosure.

Please refer to FIG. 18 to FIG. 20. FIG. 18 is a top view of a coil assembly 402 of a wireless device according to another embodiment of the present disclosure, and FIG. 19 is a schematic diagram of an upper layer structure of the coil assembly 402 on a first plane 4021 according to the embodiment of the present disclosure, and FIG. 20 is a schematic diagram of a lower layer structure of the coil assembly 402 on a second plane 4022 according to the embodiment of the present disclosure.

In this embodiment, the coil assembly 402 of the wireless device includes a first coil and a second coil. The first coil includes a first metal wire 404 disposed on the first plane 4021, and the second coil includes a second metal wire 406 disposed on the second plane 4022. As shown in FIG. 19, the first coil further includes a plurality of first separating portions 408 which is disposed between two adjacent turns of the first metal wire 404. As shown in FIG. 20, the second coil further includes a plurality of second separating portions 410 which is disposed between two adjacent turns of the second metal wire 406.

As shown in FIG. 19 and FIG. 20, the first metal wire 404 has a first inclined section 4041, and the second metal wire 406 has a second inclined section 4061. The first separating portion 408 can be electrically connected to the second metal wire 406 by a conductive assembly CA1 and the second inclined section 4061. The conductive assembly CA1 includes a plurality of metal connectors. Furthermore, the second separating portion 410 can be electrically connected to the first metal wire 404 by the a conductive assembly CA2 and the first inclined section 4041. In addition, as shown in FIG. 18, the first inclined section 4041 and the second inclined section 4061 overlap each other when viewed in the Z-axis direction.

Based on the structural configuration of this embodiment, the coil assembly 402 does not need to additionally provide a leading wire from the innermost side of the first coil or the second coil. In addition, the total length or the total area of the first separating portions 408 is greater than that of the second separating portions 410, so that the number of turns of the coil assembly 402 can be increased, and the overall resistance value can be reduced.

The present disclosure provides a wireless device including a coil assembly. In some embodiments, the coil assembly may include a first coil and a second coil, and the first coil is connected to the second coil in series. In addition, the first coil is connected to a first contact and a second contact, and the second coil is connected to the second contact and the third contact. That is, the second contact is connected between the first coil and the second coil.

Therefore, the first contact, the first coil, and the second contact can form a first circuit loop, and the first contact, the first coil, the second coil and the third contact can form a second circuit loop. The first circuit loop operates in a near field communication (NFC) band, and the second circuit loop operates as a transmitting terminal or a receiving terminal in electrical power transmission to perform wireless charging. As a result, the wireless device can perform the functions of wireless communication and wireless charging at the same time.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A wireless device, comprising:
    a first coil, comprising:
        a first metal wire, disposed in a first plane and having a first spiral structure;
        a second metal wire, disposed on a second plane and having a second spiral structure, wherein the second metal wire is electrically connected to the first metal wire;
        wherein the first metal wire and the second metal wire are continuously extended;
    a first separating portion, disposed between two adjacent turns of the first metal wire; and
    a second separating portion, disposed between two adjacent turns of the second metal wire,
    wherein the first metal wire has a first inclined section, the second metal wire has a second inclined section, the first separating portion is electrically connected to the second metal wire by a conductive assembly and the second inclined section, and the second separating portion is electrically connected to the first metal wire by the another conductive assembly and the first inclined section.

2. The wireless device as claimed in claim 1, further comprising a connecting member disposed on a third plane, and the connecting member is electrically connected to a first end of the first coil.

3. The wireless device as claimed in claim 2, wherein the third plane is located between the first plane and the second plane.

4. The wireless device as claimed in claim 2, wherein the first metal wire is connected to the second metal wire in parallel.

5. The wireless device as claimed in claim 2, further comprising a plurality of metal connectors disposed around the connecting member for electrically connecting the first and second metal wires.

6. A wireless device, comprising:
    a first coil, comprising:
        a first metal wire, disposed in a first plane and having a first spiral structure;
        a second metal wire, disposed on a second plane and having a second spiral structure, wherein the second metal wire is electrically connected to the first metal wire, wherein the first metal wire and the second metal wire are continuously extended;
    a plurality of dummy metal wires disposed on the first plane and adjacent to a first terminal contact and a second terminal contact, wherein the dummy metal wires are electrically independent from each other; and
    a metal block disposed in the first plane, and the dummy metal wires surround the metal block and are electrically independent from the metal block.

7. The wireless device as claimed in claim 1, further comprising:
    at least one electronic component, disposed in the second plane; and
    a plurality of dummy metal wires, disposed on the first plane corresponding to a position of the electronic component.

8. A wireless device, comprising:
    a first coil, comprising:
        a first metal wire, disposed in a first plane and having a first spiral structure; and
        a second metal wire, disposed on a second plane and having a second spiral structure,
    wherein the second metal wire is electrically connected to the first metal wire,
    wherein the first metal wire and the second metal wire are continuously extended,
    wherein a width of an innermost turn of the first spiral structure is narrower than a width of an outermost turn of the first spiral structure, and
    wherein the first spiral structure has an intermediate turn disposed between the innermost turn and the outermost turn, wherein a first slit is formed on the intermediate turn, and the first slit divides the intermediate turn into a left portion and a right portion, and a width of the left portion or the right portion is smaller than the width of the innermost turn of the first spiral structure.

9. The wireless device as claimed in claim 8, wherein a width of each turn of the first spiral structure gradually increases from the innermost turn to the outermost turn.

10. The wireless device as claimed in claim 1, wherein the first metal wire includes a plurality of straight sections and a plurality of curved sections, and a width of each curved section is greater than a width of the straight section connected thereto.

11. The wireless device as claimed in claim 10, wherein the first metal wire has a plurality of slits respectively formed on the curved sections.

12. The wireless device as claimed in claim 1, wherein a winding direction of the first metal wire is opposite to a winding direction of the second metal wire.

* * * * *